United States Patent
Kinoshita et al.

(10) Patent No.: US 10,465,136 B2
(45) Date of Patent: Nov. 5, 2019

(54) REFINED-COAL PRODUCTION METHOD, AND REFINED-COAL PRODUCTION DEVICE

(71) Applicant: Kobe Steel, Ltd., Kobe-shi (JP)

(72) Inventors: Shigeru Kinoshita, Takasago (JP); Takuo Shigehisa, Takasago (JP); Hiroki Watanabe, Kobe (JP); Shinichi Katsushima, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 898 days.

(21) Appl. No.: 14/423,897

(22) PCT Filed: Sep. 18, 2013

(86) PCT No.: PCT/JP2013/075199
§ 371 (c)(1),
(2) Date: Feb. 25, 2015

(87) PCT Pub. No.: WO2014/077027
PCT Pub. Date: May 22, 2014

(65) Prior Publication Data
US 2015/0210946 A1 Jul. 30, 2015

(30) Foreign Application Priority Data

Nov. 16, 2012 (JP) .................... 2012-252628

(51) Int. Cl.
*B01D 1/28* (2006.01)
*B01D 1/30* (2006.01)
(Continued)

(52) U.S. Cl.
CPC .................... *C10L 9/08* (2013.01); *C10L 5/04* (2013.01); *B01D 1/2818* (2013.01); *B01D 1/305* (2013.01);
(Continued)

(58) Field of Classification Search
CPC ........ C10G 1/04; C10G 1/045; B01D 1/2818; B01D 1/305; B01D 46/0023; B01D 46/0024; B01D 47/06; B01D 47/12
See application file for complete search history.

(56) References Cited

U.S. PATENT DOCUMENTS 5,556,436 A  9/1996 Yagaki et al.
5,660,615 A * 8/1997 Neumann ............ B01D 47/12
                                                      95/187
(Continued)

FOREIGN PATENT DOCUMENTS

JP   60-012114 A   1/1985
JP   60-125223 A   7/1985
(Continued)

OTHER PUBLICATIONS

Extended European Search Report dated Apr. 4, 2016 in Patent Application No. 13854513.2.
(Continued)

*Primary Examiner* — Jonathan Miller
*Assistant Examiner* — Jonathan Luke Pilcher
(74) *Attorney, Agent, or Firm* — Oblon, McClelland, Maier & Neustadt, L.L.P.

(57) ABSTRACT

A method for producing refined-coal has steps of (A) heating a mixture including moisture-containing coal and oil, to dehydrate the coal; (B) removing, in a first mist separator having plural baffle plates disposed in parallel, fine particles accompanying vapor generated by the dehydration step and adhered to the surface of the a first mist separator by spraying a liquid at a temperature of 50 ° C. or above and 150 ° C. or below in the first mist separator, which temperature is lower than a temperature to which the mixture is heated in step (A), wherein the sprayed liquid includes an oil component; and (C) compressing the vapor to obtain high-temperature vapor. In the step (B), the vapor is made to (Continued)

sequentially pass through the first mist separator and a second mist separator of a mesh type, while spraying liquid onto the first mist separator through which the vapor passes firstly.

8 Claims, 3 Drawing Sheets

(51) Int. Cl.
    *B01D 46/06*     (2006.01)
    *C10G 1/04*     (2006.01)
    *C10L 9/08*     (2006.01)
    *C10L 5/04*     (2006.01)
    *B01D 47/06*     (2006.01)
    *B01D 46/00*     (2006.01)

(52) U.S. Cl.
    CPC ...... *B01D 46/0023* (2013.01); *B01D 46/0024* (2013.01); *B01D 47/06* (2013.01); *C10G 1/04* (2013.01); *C10G 1/045* (2013.01); *C10L 2290/06* (2013.01); *C10L 2290/08* (2013.01); *C10L 2290/18* (2013.01); *C10L 2290/46* (2013.01); *C10L 2290/54* (2013.01); *C10L 2290/547* (2013.01)

(56) References Cited

U.S. PATENT DOCUMENTS

| | | | | |
|---|---|---|---|---|
| 8,603,301 | B2* | 12/2013 | Heins | B01D 1/065 |
| | | | | 159/47.3 |
| 8,758,602 | B2* | 6/2014 | Yamamoto | C10L 9/08 |
| | | | | 208/400 |
| 2009/0071337 | A1 | 3/2009 | Nieuwoudt | |
| 2011/0284360 | A1* | 11/2011 | Westbrook | C10L 333/003 |
| | | | | 201/8 |
| 2011/0284671 | A1 | 11/2011 | Yamamoto et al. | |
| 2015/0174519 | A1* | 6/2015 | Zhang | B01J 20/20 |
| | | | | 95/224 |

FOREIGN PATENT DOCUMENTS

| | | |
|---|---|---|
| JP | 7-233383 A | 9/1995 |
| JP | 2003-047814 A | 2/2003 |
| JP | 4365442 B1 | 11/2009 |
| JP | 2009-286900 A | 12/2009 |

OTHER PUBLICATIONS

"Amistco Mesh & Vane Mist Eliminators" Amistco Separation Products, Inc. Worldwide, XP055314107, Jan. 1, 2004, 16 Pages.
International Search Report and Written Opinion dated Nov. 12, 2013 in PCT/JP2013/075199 Filed Sep. 18, 2013.

\* cited by examiner

REFINED-COAL PRODUCTION METHOD, AND REFINED-COAL PRODUCTION DEVICE

TECHNICAL FIELD

The present invention relates to a method for producing refined-coal obtained by dehydrating moisture-containing coal by heating in oil, and a refined-coal production device.

BACKGROUND ART

Low-grade coal with a high moisture content has a low heating value. Therefore, a production method for obtaining refined-coal by dehydrating such low-grade coal by heating in oil has been developed (refer to JP-A No. H7-233383). This production method will be described referring to FIG. 2.

Figure 2:
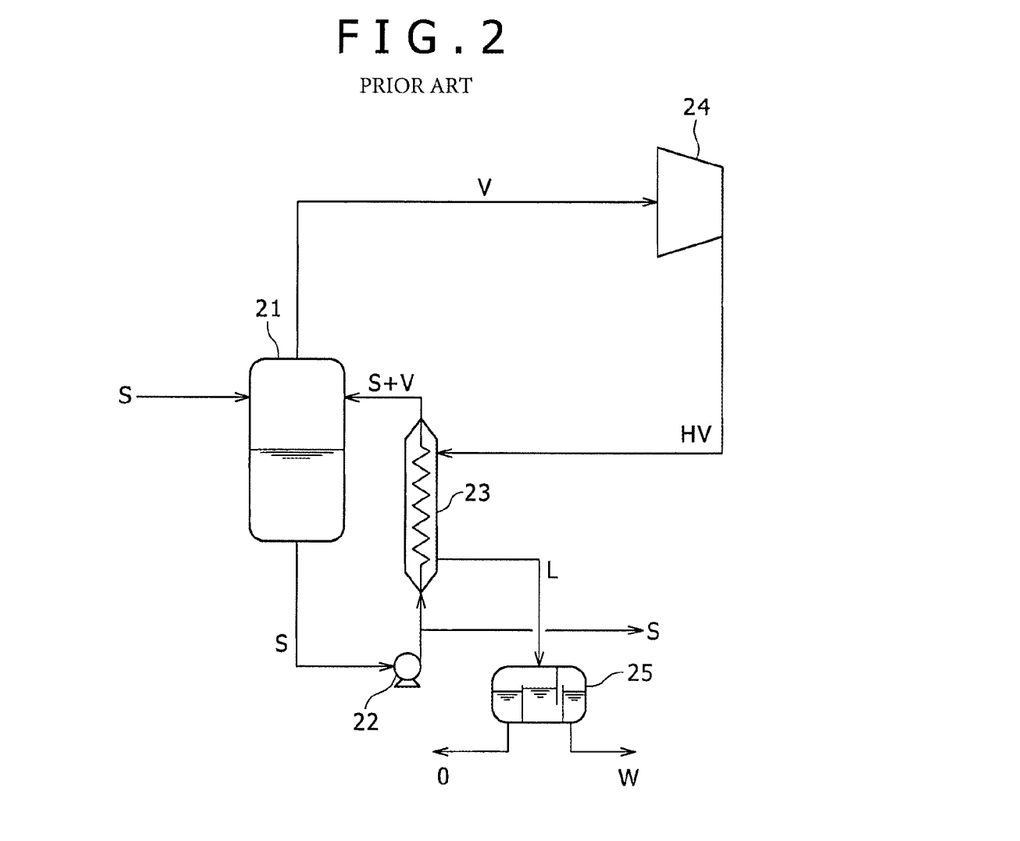

First, mixed oil including a heavy oil component and a solvent oil component is mixed with pulverized low-grade coil to obtain slurry S. The slurry S is preheated, and is thereafter supplied to a tank 21 (dehydration tank). The slurry S is drawn out from the bottom of the tank 21, is supplied to a heater 23 by a first pump 22, and is heated by high temperature vapor HV supplied from a compressor 24. By this heating, a part of the moisture and mixed oil present within pores of the low-grade coal evaporates. The heated slurry S and vapor V of water and oil are returned to the tank 21. Out of them, the vapor V is drawn out from the top portion of the tank 21, is compressed by the compressor 24, and becomes the high temperature vapor HV. This high temperature vapor HV is used as a heat carrier of the heater 23 described above, and becomes a condensed liquid L which is the mixture of the water component and the oil component. This condensed liquid L is fed to an oil separator 25, and is separated into the water component W and the oil component O. The water component W having been separated is discharged as the wastewater, and the oil component O having been separated is reused. Also, a part of the slurry S is fed to a post step (solid/liquid separating step and the like) from the first pump 22. By such production method, refined-coal which has been dried, contains heavy oil adhered within the pores, and has a high heating value can be obtained.

Figure 3:
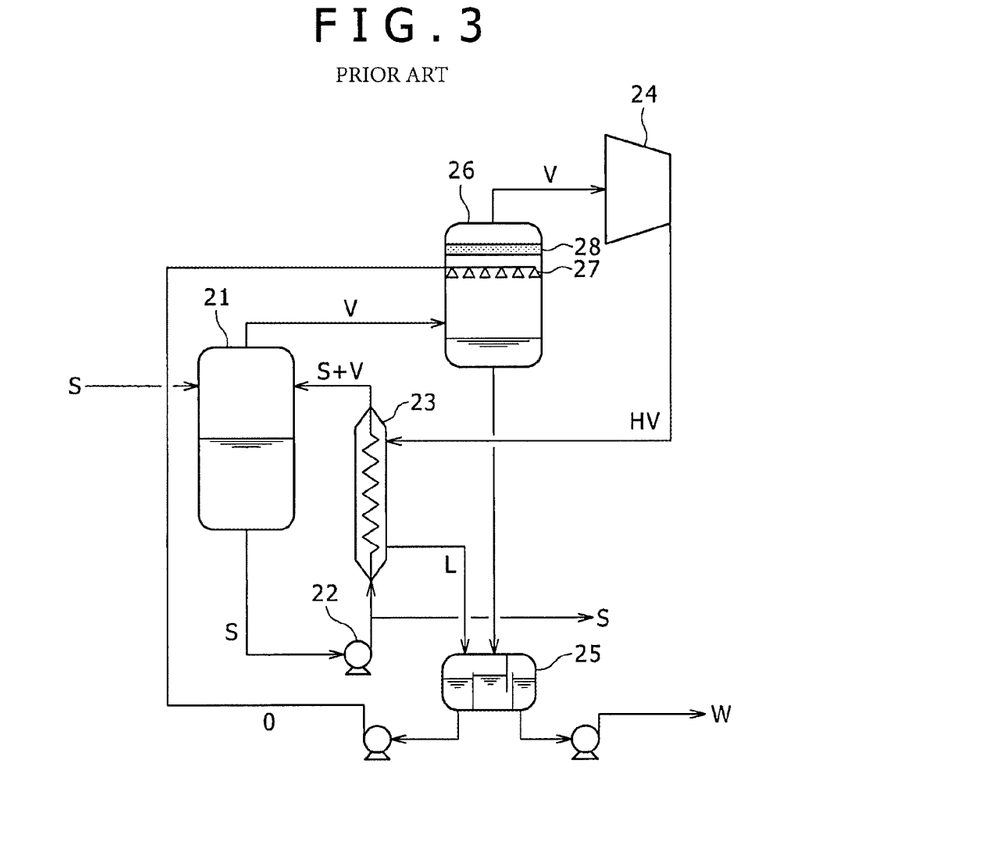

In this production method, the vapor V (mixed vapor of water and oil) generated by heating the slurry S is in a state of accompanying pores and mist-like splashes, and fine particles such as coal particles included therein are accompanied by the vapor V. Therefore, the fine particles are mixed in to the compressor 24 with the vapor V, and cause degradation of the performance and failure of the compressor 24. Accordingly, a technology has been proposed in which a defoaming tank 26 is arranged before the compressor 24 as shown in FIG. 3, oil (oil component O) of the liquid state is sprayed to the vapor V by a spray 27, and the pores are removed (refer to JP-A 2009-286900). Also, in the defoaming tank 26, a mist separator 28 for removing the splashes included in the vapor V after the pores have been removed is arranged. However, to spray oil to the vapor V is inefficient, and it is not easy to prevent mixing in of the fine particles to the compressor 24. Also, in the mist separator 28 arranged in the downstream of the spray 27, the fine particles included in the splashes can be captured to a certain extent. However, because the pressure loss and degradation of the capturing performance occur by adherence of the captured fine particles to the mist separator 28, frequent cleaning is required, and operability is insufficient.

CITATION LIST

Patent Literature

[Patent Literature 1] JP-A No. H7-233383
[Patent Literature 2] JP-A No. 2009-286900

SUMMARY OF INVENTION

Technical Problem

The present invention has been developed based on such circumstances, and its object is to provide a method for producing refined-coal and a refined-coal production device efficiently removing the splashes accompanying the vapor generated in dehydrating moisture-containing coal and excellent also in operability.

Solution to Problems

The invention for solving the problems is featured to include the steps of:

(A) heating a mixture including moisture-containing coal and oil to dehydrate the coal;

(B) removing splashes accompanied by vapor generated by the dehydration; and (C) compressing the vapor with the splashes having been removed therefrom to obtain high-temperature vapor, in which in the step (B), the vapor is made to sequentially pass through one or plural units of mist separator, and the splashes are removed while spraying liquid onto a first mist separator through which the vapor passes firstly.

In the method for producing refined-coal, the splashes accompanied by the vapor are removed while spraying the liquid onto the first mist separator through which the vapor passes firstly. Therefore, fine particles included in the splashes adhered to the surface of the first mist separator are washed away by the liquid. Accordingly, with the method for producing refined-coal, splash (fine particle) removing performance of the mist separator is high, cleaning frequency of the mist separator can be reduced, and therefore operability is excellent.

It is preferable that:

Plural units of mist separator are used in the step (B), the first mist separator is of a vane type, and a second mist separator through which the vapor passes subsequent to the first mist separator is of a mesh type. By thus using two units of the mist separator, it is possible to remove the splashes with comparatively large grain size firstly by the mist separator of the vane type and to remove next the splashes with smaller grain size by the mist separator of the mesh type, which is efficient. Also, because the vane type mist separator is used for the first mist separator, the pressure loss can be suppressed, and fine particles can be easily removed by spraying the liquid.

It is preferable to include, between the step (B) and the step (C), the step of (D) removing solid matter accompanied by the vapor with the splashes having been removed therefrom. When the mesh type separator is used for example, there is a case the fine particles captured between the meshes are dried to become solid matter and this solid matter is peeled off and is mixed in to the compressor. Therefore, by thus arranging the step of removing the solid matter, degradation of the performance of the compressor and so on can be reduced more.

It is preferable that: high temperature vapor obtained in the step (C) is used for heating of the step (A), and at least a part of a condensed liquid of the high temperature vapor used in the heating is used as the liquid in the step (B). By doing so, energy and material in the production step can be effectively utilized, and productivity can be improved.

It is preferable to further include the step of:

(E) separating the condensed liquid into oil and water, in which an oil component obtained in the step (E) is used as the liquid in the step (B). By thus spraying the oil component onto the first mist separator, the fine particles adhered along with the oil component can be more easily washed away.

Figure 1:
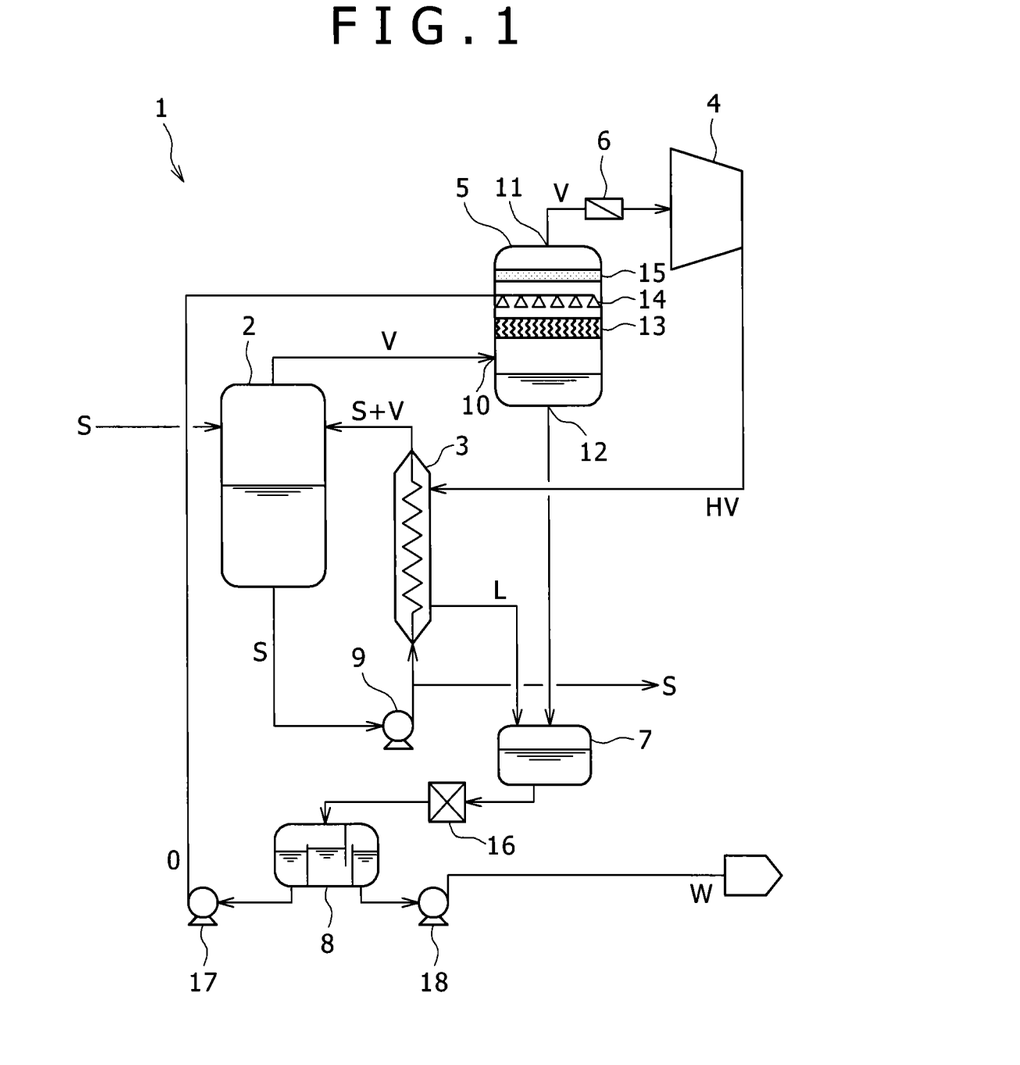

It is preferable that the temperature of the liquid sprayed in the step (B) is 50° C. or above and 150° C. or below. Because the liquid of such temperature is used, the vapor condenses, and the condensed liquid can be suppressed from being mixed in to the compressor.

The refined-coal production device of the present invention includes:

a tank that stores slurry including moisture-containing coal and oil;

a heater that heats the slurry supplied from the tank by heat-exchanging with high temperature vapor and dehydrates the coal;

a gas/liquid separator that removes splashes accompanied by vapor generated from the slurry by the heating; and a compressor that compresses the vapor, in which the gas/liquid separator includes one or plural units of mist separator disposed so that the vapor passes therethrough sequentially, and a spray that sprays liquid to a first mist separator through which the vapor passes firstly.

The refined-coal production device can remove the splashes accompanied by the vapor while spraying the liquid by the spray onto the first mist separator through which the vapor passes firstly. By doing so, the fine particles adhered to the surface of the first mist separator are washed away by the liquid. Therefore, the refined-coal production device has high splash removing performance of the mist separator, can reduce frequency of cleaning, and is therefore excellent in operability also.

It is preferable that:

the gas/liquid separator includes plural units of mist separator, the first mist separator is of a vane type, and a second mist separator through which the vapor passes subsequent to the first mist separator is of a mesh type. Because the refined-coal production device includes a combination of such two kinds of the mist separator, fine particles removing performance and so on can be improved while suppressing the pressure loss.

It is preferable that the refined-coal production device further includes a strainer that removes solid matter accompanied by vapor with the splashes having been removed therefrom. Because the refined-coal production device includes the strainer, mixing in of the solid matter to the compressor can be reduced.

It is preferable that the refined-coal production device further includes an oil separator that separates oil of a condensed liquid of high temperature vapor generated by heating in the heater. By thus further including the oil separator, the oil component having been separated can be used as the liquid for spraying onto the first mist separator, and so on, and the efficiency can be improved.

Here, "splashes" mean fine particles that are suspended within gas and include liquid, and include those formed of liquid only and the mixture of liquid and a solid (fine particles of coal and the like). "Solid matter" means those formed mainly of a solid, and liquid may be mixed therein.

Advantageous Effects of Invention

As described above, the method for producing refined-coal and the refined-coal production device of the present invention can efficiently remove the splashes accompanying the vapor generated in dehydrating the moisture-containing coal, and are excellent in operability also.

BRIEF DESCRIPTION OF DRAWINGS

FIG. 1 is a schematic drawing showing a refined-coal production device in relation with an embodiment of the present invention.

FIG. 2 is a schematic drawing showing a refined-coal production device of a prior art.

FIG. 3 is a schematic drawing showing a refined-coal production device of a prior art obtained by improving the device of FIG. 2.

DESCRIPTION OF EMBODIMENTS

Below, embodiments of the refined-coal production device and the method for producing refined-coal of the present invention will be described in detail appropriately referring to the drawings.

<Refined-Coal Production Device>

A refined-coal production device 1 of FIG. 1 mainly includes a tank 2, a heater 3, a compressor 4, a gas/liquid separator 5, a strainer 6, a condensed liquid receiver 7, and an oil separator 8.

The tank 2 stores slurry S that includes moisture-containing coal and oil. The bottom of the tank 2 communicates with a first pump 9 by piping, and the first pump 9 communicates with the pipe inner side bottom (inlet) of the heater 3 by piping.

The heater 3 is for heating the slurry S circulating through pipes arranged thereinside by heat-exchanging, and known heat exchanger can be used. The pipe inner side top portion (outlet) of the heater 3 and the upper part of the tank 2 communicate with each other by piping. Also, the pipe outer side upper part (inlet) of the heater 3 communicates with the compressor 4 by piping, and the pipe outer side lower part (outlet) communicates with the condensed liquid receiver 7 by piping. As described in detail below, coal in the slurry S is dehydrated by heating by the heater 3.

The compressor 4 is for obtaining high temperature vapor HV by compressing vapor V. A known compressor can be used for the compressor 4. The outlet of the compressor 4 communicates with the pipe outer side upper part of the heater 3.

The gas/liquid separator 5 includes a vapor flow-in port 10 in the side wall, a vapor flow-out port 11 at the top portion, and a liquid discharge port 12 in the bottom. The vapor flow-in port 10 of the gas/liquid separator 5 communicates with the top portion of the tank 2 by piping. The vapor flow-out port 11 of the gas/liquid separator 5 communicates with the compressor 4 by piping through the strainer 6. The liquid discharge port 12 of the gas/liquid separator 5 communicates with the condensed liquid receiver 7 by piping.

Inside the gas/liquid separator 5, a first mist separator 13, a spray 14, and a second mist separator 15 are arranged in this order from the lower side (the upstream side in the flow of the vapor V) at a position higher than the vapor flow-in port 10. More specifically, the vapor V passes through the first mist separator 13 and the second mist separator 15 in this order out of plural units of mist separator.

The first mist separator 13 is arranged at the most upstream position that is the position where the vapor V passes through firstly (the position that contacts the vapor V firstly). The first mist separator 13 is a mist separator of a vane type. The mist separator of a vane type includes plural baffle plates disposed in parallel, and can capture splashes accompanied by the vapor V by that the splashes collide on the baffle plates. With respect to the shape of the baffle plates, a wave shape can be suitably used. The direction of the ridges of the baffle plates of the wave shape may be either of the parallel direction or the orthogonal direction with respect to the flow of the vapor. The mist separator of this vane type can excellently capture the splashes (fine particles) with the grain size of 10 μm or more for example.

The spray 14 includes plural spray nozzles. The spray 14 is arranged so as to spray the liquid onto the first mist separator 13 from the above.

The second mist separator 15 is a mist separator of a mesh type. The mist separator of a mesh type can capture the splashes (fine particles) with a desired grain size by adjusting the size of the mesh. It is preferable to use one that can capture the splashes (fine particles) with the grain size of 1 μm or more and less than 10 μm for example.

The strainer 6 is arranged in piping that communicates the gas/liquid separator 5 and the compressor 4 with each other. The strainer 6 is for removing the solid matter accompanied by the vapor V. For the strainer 6, a known strainer having a structure formed of a mesh made of a metal and so on can be used.

The bottom of the condensed liquid receiver 7 communicates with the oil separator 8 by piping through a filter 16. The oil separator 8 includes an oil component tank and a water component tank storing the oil component and the water component having been separated. The oil component tank communicates with the spray 14 by piping through a second pump 17. The water component tank is drained by piping through a third pump 18.

<Method for Producing Refined-Coal>

The method for producing refined-coal of the present invention includes:

a step (A) in which a mixture including moisture-containing coal and oil is heated to dehydrate the coal, a step (B) in which splashes accompanied by vapor generated by the dehydration are removed, and a step (C) in which the vapor with the splashes having been removed therefrom is compressed to obtain high-temperature vapor, and further includes suitably:

a step (D), between the step (B) and the step (C), in which solid matter accompanied by the vapor with the splashes having been removed therefrom is removed, and a step (E) in which the condensed liquid is separated into oil and water.

The method for producing will be described below as an example of using the refined-coal production device 1 specifically.

The slurry S (mixture) including moisture-containing coal and oil is preheated, and is thereafter supplied to the tank 2. The coal is low grade coal with high water content, and is coal whose heating value per unit mass is comparatively low. As the coal (low grade coal), sub-bituminous coal, brown coal, lignite, peat and the like can be used. Such coal is mixed with oil in a pulverized state, and becomes the slurry S. With respect to the oil, mixed oil including a heavy oil component such as asphalt and a solvent oil component such as kerosene can be used. Also, slurry means suspension in which fine solid matter is dispersed in liquid, and is a mixed body having fluidity of a degree capable of being transferred by a pump in general. However, the mixture of coal and oil in the present invention is not limited to slurry, and may be a cake-like mixture with low fluidity, or a mixture of a state with extremely high fluidity adversely.

Step (A)

The slurry S is drawn out from the bottom of the tank 2, and is supplied to the heater 3 by the first pump 9. The slurry S is heated in the heater 3 by heat-exchanging with the high temperature vapor HV supplied from the compressor 4. The coal (low grade coal) is dehydrated. More specifically, a part of the water component and the mixed oil present within the pores of the coal evaporates. The heating temperature is 100-250° C. for example, and is preferably 120-200° C. Also, at the time of the heating, the slurry S may be in a pressurized state.

The slurry S having been heated and the mixed vapor V of water and oil are returned to the tank 2. Out of them, the vapor V is drawn out from the top portion of the tank 2, and is supplied to the gas/liquid separator 5 from the vapor flow-in port 10.

Step (B)

The vapor V accompanies the splashes as described above, and fine particles such as the particles of the coal are included in the splashes. In the gas/liquid separator 5, the vapor V passes through the first mist separator 13 (vane-type mist separator) firstly. By the first mist separator 13, the splashes (fine particles) with comparatively large grain size are captured. Onto the first mist separator 13, liquid (specifically the oil component O described below) is sprayed by the spray 14 constantly during operation. By doing so, the splashes (fine particles) adhered to the surface of the first mist separator 13 are washed away by the liquid. Therefore, the production method has high splash (fine particle) removing performance of the mist separator, can reduce the frequency of cleaning of the first mist separator 13 and the like, and is therefore excellent in operability also.

Also, by using a vane type mist separator for the first mist separator 13, the pressure loss can be suppressed. Further, when the vane type mist separator has a structure formed of plural wave-like plates, removal of the fine particles using liquid can be performed easily in particular.

As the temperature of the liquid to be sprayed, 50° C. or above and 150° C. or below is preferable. By using the liquid of such temperature, condensation of the vapor V and mixing in of the condensed liquid to the compressor 4 can be suppressed. Temperature adjustment of the liquid can be performed by heating by a known method and so on.

As the liquid to be sprayed, it is preferable to use recycled oil component O described below. By thus spraying the oil component O, removing performance for the fine particles securely adhered to the first mist separator 13 along with oil can be improved.

Further, although the quantity of the liquid to be sprayed is not particularly limited, it is approximately 400 kg/h or more and 3,500 kg/h or less for example, and is preferably 1,000 kg/h or more and 3,000 kg/h or less.

Also, in the production method, by spraying the liquid by the spray 14, the liquid itself in the splashes can capture the splashes. From this fact also, the production method has high removing performance for the splashes (fine particles) accompanied by the vapor V.

The fine particles having been washed away and the liquid collect in the bottom of the gas/liquid separator 5, and are discharged to the condensed liquid receiver 7.

The vapor V passes through the first mist separator 13 and the spray 14, and thereafter passes through the second mist separator 15 (the mesh type mist separator) arranged downstream of (above) them. According to the production method, by thus using two units of the mist separator, it is possible to remove firstly the splashes (fine particles) with comparatively large grain size by the vane type mist separator and to remove the splashes (fine particles) with smaller grain size next by the mesh type mist separator with less pressure loss, therefore the pressure loss can be suppressed, and it is efficient.

Step (D)

The vapor V is discharged from the vapor flow-out port 11 of the gas/liquid separator 5, and passes through the strainer 6. When the mesh type separator is used, there is a case the fine particles captured between the meshes are dried and the fine particles (the solid matter) dried are peeled off and are mixed in to the compressor 4. Therefore, by thus arranging the strainer 6 (the step of removing the solid matter), degradation of the performance of the compressor 4 and so on can be reduced more.

Step (C)

The vapor V having passed through the strainer 6 with the splashes and the like having been removed therefrom is compressed by the compressor 4, and becomes high temperature vapor HV. The high temperature vapor HV is utilized as a heat carrier in the heater 3. Also, the high temperature vapor HV condenses by heat exchanging and becomes the condensed liquid L, and the condensed liquid L is stored in the condensed liquid receiver 7.

Step (E)

The condensed liquid L from the heater 3, the liquid from the gas/water separator 5, and the like stored in the condensed liquid receiver 7 are supplied to the oil separator 8 after the solid portion is removed by the filter 16. In the oil separator 8, the condensed liquid and the like described above are separated into the oil component O and the water component W.

The water component W having been separated is drained through the third pump 18. On the other hand, the oil component O having been separated is supplied to the spray 14 through the second pump 17 as described above, and is utilized as the liquid to be sprayed.

Also, a part of the slurry S is fed to a post step (solid/liquid separating step and the like) from the first pump 9, and becomes refined-coal. In the production method, by going through such step, refined-coal can be obtained which has been dehydrated (dried), contains heavy oil adhered within the pores, and has a high heating value.

According to the production method, as described above, the splashes (fine particles) accompanying the vapor V generated in dehydrating the coal can be efficiently removed, and operability is excellent. Also, in the production method, as described above, by utilizing the vapor V as a heat carrier and utilizing the oil component in the condensed liquid, energy and material in the production step can be effectively utilized, and productivity can be improved.

Other Embodiment

The method for producing refined-coal and the refined-coal production device of the present invention are not limited to the embodiments described above. For example, in the refined-coal production device, it is not necessary to install plural units of the mist separator, and a mist separator(s) other than the combination of the vane type mist separator and the mesh type mist separator may be used. Further, it is also possible to use a combination of mist separators of three units or more or three kinds or more. As a mist separator of other type, a gyration type mist separator and the like can be exemplified for example. They may be designed appropriately taking the splash (fine particle) removing performance, the degree of allowable pressure loss, and the like into consideration.

Also, as the liquid to be sprayed, other than the oil component separated and utilized again can be also used. For example, it is also possible to use the condensed liquid as it is without being separated, or to use other liquid.

(Vapor Purification Method)

A part of the method for producing refined-coal of the present invention can be also applied to other fields as a vapor purification method. More specifically, the vapor purification method is a vapor purification method including:

a step in which splashes are removed from vapor accompanying the splashes, in which in the step, the vapor is made to sequentially pass through one or plural units of mist separator, and the splashes are removed while spraying liquid onto a first mist separator through which the vapor passes firstly.

In other words, the step (B) for removing the splashes in the method for producing refined-coal described above can be utilized in other fields in which it is necessary to remove splashes from vapor accompanying the splashes including fine particles and so on. As the other fields, distillation and fractional distillation in petrochemistry, oil refinery, and the like, removal and cleaning and the like of air pollutant, and so on can be cited. Also, because the detail of this step is similar to the step (B) described above, detailed description thereof will be omitted.

According to the vapor purification method, because the splashes accompanied by the vapor are removed while the liquid is sprayed onto the first mist separator through which the vapor passes firstly, the splashes adhered to the surface of the first mist separator are washed away by the liquid. Therefore, the vapor purification method has high splash removing performance of the mist separator and can reduce frequency of cleaning, and is therefore excellent in operability also.

EXAMPLES

Although the present invention will be described below in more detail by examples, the present invention is not limited to these examples.

Example 1

The device shown in FIG. 1 was used, the spray within the gas/liquid separator was operated constantly, and the refined-coal was produced. The quantity of the vapor generated by the heater and supplied to the gas/liquid separator was 12,600 kg/h (7,800 kg/h of water and 4,800 kg/h of oil), the pressure was 0.40 MPa, and the temperature was 150° C. On the other hand, the flow rate of the liquid (recycled oil) sprayed from the spray was made 2,400 kg/h, and the temperature was made 60° C.

Comparative Example 1

Refined-coal was produced using a system obtained by installing a strainer before the compressor in the device shown in FIG. 3. The quantity, pressure and temperature of the vapor generated by the heater were similar to those of Example 1.

Comparative Example 2

Refined-coal was produced in a manner similar to that of Example 1 with the exception that the spray was not operated.

<Evaluation>

In the example and the comparative examples, based on the inside cleaning number of times of the gas/liquid separator and the inside cleaning number of times of the strainer, the continuous operation performance (operability) was evaluated. Also, the operation was carried out for three days each, and the average number of times was adopted for the evaluation. Also, each of the inside cleaning was performed at a time point when it was determined from the visual observation and the like that the capturing performance of the gas/liquid separator and the strainer deteriorated to a degree of not functioning substantially. This continuous operation performance was evaluated to be A for a case both of the inside cleaning number of times of the gas/liquid separator and the strainer was less than 3 times/day, and to be B for a case either of the cleaning number of times of them was 3 times/day or more. The evaluation result is shown in Table 1.

TABLE 1

| | Constituent factor | | | Operation method | | |
|---|---|---|---|---|---|---|
| | First mist separator (vane type) | Second mist separator (mesh type) | Continuous spray | Gas/liquid separator inside cleaning number of times (times/day) | Strainer inside cleaning number of times (times/day) | Continuous operability evaluation |
| comparative example 1 | Furnished | Not furnished | Not furnished | 8 | 13 | B |
| comparative example 2 | Furnished | Furnished | Not furnished | 5 | 8 | B |
| Example 1 | Furnished | Furnished | Furnished | 0 | 1 | A |

As shown in Table 1, it is known that, according to the production method of the present invention, the inside cleaning number of times of the gas/liquid separator and the strainer can be significantly reduced and the continuous operation performance (operability) can be improved.

INDUSTRIAL APPLICABILITY

As described above, according to the method for producing refined-coal of the present invention, the continuous operation performance in producing refined-coal from low grade coal can be improved.

REFERENCE SIGNS LIST

1 . . . Refined-coal production device
2 . . . Tank
3 . . . Heater
4 . . . Compressor
5 . . . Gas/liquid separator
6 . . . Strainer
7 . . . Condensed liquid receiver
8 . . . Oil separator
9 . . . First pump
10 . . . Vapor flow-in port
11 . . . Vapor flow-out port
12 . . . Liquid discharge port
13 . . . First mist separator
14 . . . Spray
15
15 . . . Second mist separator
16 . . . Filter
17 . . . Second pump
18 . . . Third pump
S . . . Slurry
V . . . Vapor
HV . . . High temperature vapor
L . . . Condensing liquid
  O . . . Oil component
W . . . Water component

The invention claimed is:

1. A method for producing refined-coal, comprising the steps of:
   (A) heating a mixture including moisture-containing coal and oil, to dehydrate the coal, and providing a vapor generated by the dehydration step to a first mist separator of a vane type;
   (B) removing, in the first mist separator, fine particles accompanying the vapor generated by the dehydration step and adhered to the surface of the first mist separator by spraying a liquid at a temperature of 50° C. or above and 150° C. or below in the first mist separator, which temperature is lower than a temperature of the vapor provided to the first mist separator, wherein the sprayed liquid includes an oil component; and
   (C) compressing the vapor, with the fine particles having been removed therefrom, to obtain high-temperature vapor,
   wherein in the step (B), the vapor is made to sequentially pass through the first mist separator of the vane type and a second mist separator of a mesh type, while spraying liquid onto the first mist separator through which the vapor passes firstly, to wash the fine particles adhered to the surface of the first mist separator, and
   wherein the first mist separator comprises plural baffle plates disposed in parallel.

2. The method for producing refined-coal according to claim 1, wherein
   high temperature vapor obtained in the step (C) is used for heating of the step (A), and at least a part of a condensed liquid of the high temperature vapor used in the heating is used as the liquid in the step (B).

3. The method for producing refined-coal according to claim 2, further comprising the step of:
  (E) separating the condensed liquid into oil and water, wherein
  an oil component obtained in the step (E) is used as the liquid in the step (B).

4. The method for producing refined-coal according to claim 1, wherein the temperature of the vapor provided to the first mist separator is 150° C. and the temperature of the sprayed liquid is 60° C.

5. A method for producing refined-coal, comprising the steps of:
  (A) heating a mixture including moisture-containing coal and oil, to dehydrate the coal, and providing a vapor generated by the dehydration step to a first mist separator of a vane type;
  (B) removing, in the first mist separator, fine particles accompanying the vapor generated by the dehydration step and adhered to the surface of the first mist separator by spraying a liquid at a temperature of 50° C. or above and 150° C. or below in the first mist separator, which temperature is lower than a temperature of the vapor provided to the first mist separator, wherein the sprayed liquid includes an oil component; and
  (C) compressing the vapor, with the fine particles having been removed therefrom, to obtain high-temperature vapor,
  wherein in the step (B), the vapor is made to sequentially pass through the first mist separator of the vane type and a second mist separator of a mesh type, while spraying liquid onto the first mist separator through which the vapor passes firstly, to wash the fine particles adhered to the surface of the first mist separator,
  wherein the first mist separator comprises plural baffle plates disposed in parallel, and
  wherein the sprayed liquid in step (B) is at a temperature lower than a condensation temperature of the vapor and causes condensation of the vapor.

6. The method for producing refined-coal according to claim 5, wherein
  high temperature vapor obtained in the step (C) is used for heating of the step (A), and
  at least a part of a condensed liquid of the high temperature vapor used in the heating is used as the liquid in the step (B).

7. The method for producing refined-coal according to claim 6, further comprising the step of:
  (E) separating the condensed liquid into oil and water, wherein
  an oil component obtained in the step (E) is used as the liquid in the step (B).

8. The method for producing refined-coal according to claim 5, wherein the temperature of the vapor provided to the first mist separator is 150° C. and the temperature of the sprayed liquid is 60° C.

* * * * *